(12) United States Patent
Sivakumar et al.

(10) Patent No.: US 11,880,697 B2
(45) Date of Patent: Jan. 23, 2024

(54) METHODS AND DEVICE FOR TASK MOBILIZATION

(71) Applicant: Georgia Tech Research Corporation, Atlanta, GA (US)

(72) Inventors: Raghupathy Sivakumar, Atlanta, GA (US); Uma Parthavi Moravapalle, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/181,672

(22) Filed: Mar. 10, 2023

(65) Prior Publication Data

US 2023/0214242 A1  Jul. 6, 2023

Related U.S. Application Data

(63) Continuation of application No. 16/969,036, filed as application No. PCT/US2019/017566 on Feb. 12, 2019, now Pat. No. 11,635,975.

(60) Provisional application No. 62/629,208, filed on Feb. 12, 2018.

(51) Int. Cl.
*G06F 8/76* (2018.01)
*G06F 9/451* (2018.01)
*G06F 21/62* (2013.01)
*H04L 67/50* (2022.01)

(52) U.S. Cl.
CPC ................ *G06F 9/451* (2018.02); *G06F 8/76* (2013.01); *G06F 21/629* (2013.01); *H04L 67/535* (2022.05)

(58) Field of Classification Search
CPC .................................................. G06F 3/0482
See application file for complete search history.

(56) References Cited

U.S. PATENT DOCUMENTS

| 8,639,561 | B2 * | 1/2014 | Boudreau ............ G06Q 10/063 |
| | | | 705/400 |
| 8,832,681 | B1 | 9/2014 | Cantrell |
| 9,372,716 | B1 * | 6/2016 | Ramani ..................... G06F 8/61 |
| 9,830,611 | B1 * | 11/2017 | Hamill ................... H04W 4/029 |
| 10,726,095 | B1 * | 7/2020 | Pallemulle .......... G06F 16/9577 |
| 2003/0189591 | A1 | 10/2003 | Mo |
| 2006/0204011 | A1 | 9/2006 | Adams |
| 2009/0063178 | A1 | 3/2009 | Pousti et al. |
| 2009/0254912 | A1 | 10/2009 | Roundtree |
| 2010/0077321 | A1 | 3/2010 | Shen |

(Continued)

OTHER PUBLICATIONS

Search Report from Application No. PCT/US2019/017566 dated Jun. 14, 2019 (11 pages).

*Primary Examiner* — Di Xiao
(74) *Attorney, Agent, or Firm* — Troutman Pepper Hamilton Sanders LLP; Ryan A. Schneider; Dustin B. Weeks (57) ABSTRACT

A method for task mobilization may include a server receiving user inputs from a desktop application. A user input may correspond to a respective function performed by a user on the desktop application. A processor may identify the respective functions of the user inputs. Further, the method may include translating the respective functions into respective mobile view functions. Based on the respective mobile view functions, the processor may generate a mobile application and provide the mobile application to a mobile user device.

18 Claims, 5 Drawing Sheets

(56) References Cited

U.S. PATENT DOCUMENTS

| | | |
|---|---|---|
| 2011/0035036 A1 | 2/2011 | Meng et al. |
| 2011/0167105 A1 | 7/2011 | Ramakrishnan et al. |
| 2012/0226970 A1 | 9/2012 | Porter |
| 2013/0117350 A1 | 5/2013 | Beck |
| 2013/0283397 A1 | 10/2013 | Griffin |
| 2014/0164944 A1 | 6/2014 | Sivakumar |
| 2014/0289621 A1 | 9/2014 | Sivakumar et al. |
| 2014/0372752 A1 | 12/2014 | Sallis |
| 2015/0170327 A1 | 6/2015 | Feldman |
| 2015/0281333 A1* | 10/2015 | Albert .................. G06F 16/972 715/744 |
| 2015/0350360 A1 | 12/2015 | Wu et al. |
| 2016/0103815 A1 | 4/2016 | Suryadi |
| 2017/0041282 A1 | 2/2017 | Hsia |
| 2018/0089173 A1* | 3/2018 | Prendergast .......... G10L 15/005 |
| 2018/0129544 A1* | 5/2018 | Ekambaram ............ G06F 9/541 |

\* cited by examiner

FIG. 5

METHODS AND DEVICE FOR TASK MOBILIZATION

CROSS-REFERENCE TO RELATED APPLICATIONS

This application is a continuation of U.S. patent application Ser. No. 16/969,036 filed 12 Feb. 2019, which is a § 371 National Stage of International Patent Application No. PCT/US2019/017566 filed 12 Feb. 2019, which PCT claims the benefit of U.S. Provisional Patent Application No. 62/629,208 filed 12 Feb. 2018, the contents of each are hereby incorporated in its entirety as if fully set forth herein.

STATEMENT REGARDING FEDERALLY SPONSORED RESEARCH OR DEVELOPMENT

This invention was made with government support under Award Nos. IIP-1701115, 1513884 and 1319455 awarded by the National Science Foundation. The government has certain rights in the invention.

THE NAMES OF THE PARTIES TO A JOINT RESEARCH AGREEMENT

Not Applicable

SEQUENCE LISTING

Not Applicable

STATEMENT REGARDING PRIOR DISCLOSURES BY THE INVENTOR OR A JOINT INVENTOR

Not Applicable

BACKGROUND OF THE DISCLOSURE

1. Field of the Disclosure

The presently disclosed subject matter relates generally to methods and devices for task mobilization and, more particularly, to methods and devices for dynamically generated mobile applications.

2. Background

The adoption of mobile devices, and in particular smartphones, has grown steadily over the last decade. Fifty-one percent of enterprise workers today use mandated apps for their business on their phones. Seventy-seven percent of those workers rely on their personal smartphones to perform their work. One of the key drivers of the adoption and use of smartphones is the self-perceived increase in productivity.

While mobilizing enterprise applications may offer increased productivity, large enterprises find it difficult to create a one-size fits all mobile application for its workers. This is so because an average enterprise runs over 400 applications for its business operations with each application used by workers across different job roles. Therefore, large enterprises and other entities would benefit from mobile applications tailored to the user's specific tasks. Accordingly, there is a need for an improved method and device for providing dynamically generated customer mobile user applications.

BRIEF SUMMARY OF THE DISCLOSURE

Aspects of the disclosed technology include methods and devices for task mobilization. Consistent with the disclosed exemplary embodiments, the methods can use one or more mobile user devices, processors, web servers, desktop devices, or application programming interfaces (APIs). In some cases, the methods and devices may include a server receiving a plurality of user inputs from a desktop application. Each of the plurality of user inputs correspond to a respective function performed by a user on the desktop application. Each of the respective functions may also include a plurality of features. The method may further include identifying the respective functions of the plurality of user inputs. The method may also translate the respective functions into respective into mobile view functions. Further, based on the respective mobile view functions, a mobile application may be generated. The mobile application may be provided to a mobile user device.

An exemplary embodiment provides a method comprising capturing a first user input corresponding to a first function including a first feature and a second feature, the first function performed by a user on a first computing device, and providing a usage modality, for download, to a second computing device if at least one of the first and second features of the first function for use with the usage modality based on an amount of required workload for use with the second computing device meets a threshold requirement.

Another exemplary embodiment provides a method of application workflow mobilization comprising capturing user inputs, each user input corresponding to a function including features, the functions performed by a user on a desktop application and related to a workflow to be mobilized, and providing a usage modality, for download, to a mobile user device if a required workload for the user of the mobile user device meets a threshold requirement.

Another exemplary embodiment provides a method comprising capturing a first user input corresponding to a first function including a first feature and a second feature, and a second user input corresponding to a second function including a first feature and a second feature, the respective functions performed by a user on a first computing device, and providing a usage modality, for download, to a second computing device if at least one of the first and second features of the respective functions for use with the usage modality based on an amount of required workload for use with the second computing device is less than a predetermined amount.

Another exemplary embodiment provides a method for task mobilization comprising monitoring, by an application, a program to identify a user input corresponding to a function performed by the user on the program, terminating monitoring of the program, and transmitting, to a server, the user input.

Another exemplary embodiment provides a method for task mobilization comprising receiving a first request to begin monitoring a program, monitoring, by an application, the program to identify at least a first user input and a second user input, the first user input corresponding to a first function performed by the user on the program, the second user input corresponding to a second function performed by the user on the program, wherein the first and second functions are performed by the user on a desktop application and are related to a workflow to be mobilized, translating the first function into a first mobile view function and the second function into a second mobile view function, configuring, based upon the translating, the ability of the user to perform the mobilized workflow via a usage modality based on the respective mobile view functions on a mobile user device, receiving a second request to terminate monitoring the program, terminating monitoring of the program, and transmitting, to a server, one or more of the user inputs.

Another exemplary embodiment provides a method for task mobilization, comprising receiving, by a server and from a desktop application, a plurality of user inputs, each user input corresponding to a respective function performed by a user on the desktop application, wherein each of the respective functions includes a plurality of features, identifying the respective functions of the plurality of user inputs, translating the respective functions into respective mobile view functions, generating, based on the respective mobile view functions, a mobile application, and providing the mobile application to a mobile user device.

Another exemplary embodiment provides a method for task mobilization, comprising receiving, from a user and by an application, a first request to begin monitoring a desktop program, monitoring, by the application, the desktop program to identify one or more user inputs, each user input corresponding to a respective function performed by the user on the desktop program, receiving, from the user, a second request to terminate monitoring the desktop program, terminating monitoring of the desktop program, and transmitting, to a server, the one or more user inputs.

Another exemplary embodiment provides a method for task mobilization, comprising receiving, by a server and from a desktop application, a plurality of user inputs, each user input corresponding to a respective function performed by a user on the desktop application, wherein each of the respective functions includes a plurality of features, receiving, from the desktop application, user identification information, identifying the respective functions of the plurality of user inputs including a plurality of associated features, for each of the respective functions, determining at least one of the plurality of features for use with a mobile application based on an amount of required workload for use with a mobile user device being less than a predetermined amount, generating, based on each of the respective functions and the determined at least one of the plurality of features, the mobile application, associating the user identification information with the generated mobile application, and providing the mobile application to the mobile user device.

Another exemplary embodiment provides a method of application workflow mobilization comprising capturing a first user input corresponding to a first function including a first feature and a second feature, and a second user input corresponding to a second function including a first feature and a second feature, the respective functions performed by a user on a desktop application and related to a workflow to be mobilized, translating, based upon the capturing, respective functions into respective mobile view functions, configuring, based upon the translating, the ability of the user to perform the mobilized workflow via a usage modality based on the respective mobile view functions on a mobile user device, and providing the usage modality, for download, to the mobile user device if at least one of the first and second features of the respective functions for use with the usage modality based on an amount of required workload for use with the mobile user device is less than a predetermined amount.

Another exemplary embodiment provides a method of code-less enterprise application workflow mobilization comprising receiving, by a server and from a desktop application, a first user input and a second user input, wherein the desktop application comprises an enterprise application with navigational workflows, wherein the first user input corresponds to a first function performable by a user performing a workflow to be mobilized on the desktop application, the workflow to be mobilized being one from among the navigational workflows of the enterprise application, wherein the second user input corresponds to a second function performable by the user performing the workflow to be mobilized on the desktop application, wherein the first function includes a first feature and a second feature, and wherein the second function includes a first feature and a second feature, identifying the first and second functions of the first and second user inputs, translating the first function into a first mobile view function and the second function into a second mobile view function, wherein translating comprises identifying, from each of the first and second functions, the first and second features, and for each function, determining at least one of the first and second features for use with a usage modality, based on the mobile view functions, based on an amount of required workload for use with a mobile user device being less than a predetermined amount, configuring, based on the first and second mobile view functions, the ability of the user to perform the workflow via a usage modality on the mobile user device via a code-less mobilization, and providing the usage modality, for download, to the mobile user device if at least one of the first and second features of each function has an amount of required workload for use less than the predetermined amount, wherein the workflow to be mobilized is a linear workflow within the enterprise application in which all the user inputs are performed on a single page of the enterprise application.

Another exemplary embodiment provides a method of application workflow mobilization comprising capturing a first user input corresponding to a first function including a first feature and a second feature, and a second user input corresponding to a second function including a first feature and a second feature, the respective functions performed by a user on a desktop application and related to a workflow to be mobilized, translating, based upon the capturing, respective functions into respective mobile view functions, configuring, based upon the translating, the ability of the user to perform the mobilized workflow via a usage modality based on the respective mobile view functions on a mobile user device, and providing the usage modality, for download, to the mobile user device if at least one of the first and second features of the respective functions for use with the usage modality based on an amount of required workload for use with the mobile user device is less than a predetermined amount.

Another exemplary embodiment provides a method of code-less enterprise application workflow mobilization comprising receiving, by a server and from a desktop application, a first user input and a second user input, wherein the desktop application comprises an enterprise application with navigational workflows, wherein the first user input corresponds to a first function performable by a user performing a workflow to be mobilized on the desktop application, the workflow to be mobilized being one from among the navigational workflows of the enterprise application, wherein the second user input corresponds to a second function performable by the user performing the workflow to be mobilized on the desktop application, wherein the first function includes a first feature and a second feature, and wherein the second function includes a first feature and a second feature, identifying the first and second functions of the first and second user inputs, translating the first function into a first mobile view function and the second function into a second mobile view function, wherein translating comprises identifying, from each of the first and second functions, the first and second features, and for each function, determining at least one of the first and second features for use with a usage modality, based on the mobile view functions, based on an amount of required workload for use with a mobile user device being less than a predetermined amount, configuring, based on the first and second mobile view functions, the ability of the user to perform the workflow via a usage modality on the mobile user device via a code-less mobilization, and providing the usage modality, for download, to the mobile user device if at least one of the first and second features of each function has an amount of required workload for use less than the predetermined amount, wherein the workflow to be mobilized is a linear workflow within the enterprise application in which all the user inputs are performed on a single page of the enterprise application.

In any of the exemplary embodiments described herein, where applicable, the method can further comprise receiving, from the desktop application, user address information, and providing the mobile application, for download, to the user address information.

In any of the exemplary embodiments described herein, where applicable, the method can further comprise receiving, from the desktop application, user identification information, and associating the user identification information with the generated mobile application.

In any of the exemplary embodiments described herein, where applicable, the method can further comprise the plurality of user inputs can be stored on the server.

In any of the exemplary embodiments described herein, where applicable, the method can further comprise translating the respective functions into respective mobile view functions can comprise identifying, from each of the respective functions, the plurality of features, and for each of the respective functions, determining at least one of the plurality of features for use with the mobile application based on an amount of required workload for use with the user device being less than a predetermined amount.

In any of the exemplary embodiments described herein, where applicable, providing the mobile application to the user device further can comprise receiving from the mobile user device, a request to access the mobile application, wherein the request includes a platform to access the mobile application, identifying the mobile application based at least in part on the user identification information, and providing the mobile application to the mobile user device at the requested platform.

In any of the exemplary embodiments described herein, where applicable, generating the mobile application can be further based on the stored plurality of user inputs.

In any of the exemplary embodiments described herein, where applicable, generating the mobile application can be further based on the determined at least one of the plurality of features.

In any of the exemplary embodiments described herein, where applicable, the platform can be at least one of a social media platform, a workplace collaboration platform, email, and SMS.

In any of the exemplary embodiments described herein, where applicable, identifying the mobile application further can comprise receiving, from the user, an application name, and identifying, the mobile application based on the mobile application having a title matching at least in part the application name.

In any of the exemplary embodiments described herein, where applicable, the method can further comprise transmitting, to the server, user address information.

In any of the exemplary embodiments described herein, where applicable, the method can further comprise transmitting, to the server, user identification information.

In any of the exemplary embodiments described herein, where applicable, the application and the desktop program can run on a desktop device.

In any of the exemplary embodiments described herein, where applicable, the application can run on a central processing unit (CPU) of a remote device.

In any of the exemplary embodiments described herein, where applicable, the plurality of user inputs can be stored on the server.

In any of the exemplary embodiments described herein, where applicable, providing the mobile application to the user device can further comprise receiving from the mobile user device, a request to access the mobile application, wherein the request includes a platform to access the mobile application, identifying the mobile application based at least in part on the user identification information, and providing the mobile application to the mobile user device at the requested platform.

In any of the exemplary embodiments described herein, where applicable, identifying the mobile application can further comprise receiving, from the mobile user device, an application name, and identifying, the mobile application based on the mobile application having a title matching at least in part the application name.

In any of the exemplary embodiments described herein, where applicable, the method can further comprise identifying the functions of the inputs, generating the usage modality comprising a mobile application, receiving, from the desktop application, user identification information, and associating the user identification information with the generated mobile application.

In any of the exemplary embodiments described herein, where applicable, capturing the first and second user inputs can comprise receiving, by a server and from the desktop application, the first and second user inputs, wherein the application workflow mobilization is a code-less mobilization, and wherein the first and second user inputs are stored on the server.

In any of the exemplary embodiments described herein, where applicable, the method can further comprise receiving a first request to begin monitoring the desktop application, monitoring the desktop application to identify the first and second user inputs, receiving a second request to terminate monitoring the desktop application, and transmitting, to a server, the first and second user inputs.

In any of the exemplary embodiments described herein, where applicable, the method can further comprise terminating monitoring of the desktop program, and transmitting, to the server, user address information.

In any of the exemplary embodiments described herein, where applicable, the method can further comprise terminating monitoring of the desktop application, and transmitting, to a server, user identification information.

In any of the exemplary embodiments described herein, where applicable, the usage modality can be selected from the group consisting of using a social media application, a workplace application, an email application, an SMS application, and an application generated based on the mobile view functions.

In any of the exemplary embodiments described herein, where applicable, the method can further comprise generating the usage modality, wherein the first and second user inputs are stored on the server, and wherein generating the usage modality is further based on the stored user inputs.

In any of the exemplary embodiments described herein, where applicable, generating the usage modality can be further based on the determined at least one of the first and second features.

In any of the exemplary embodiments described herein, where applicable, the method can further comprise receiving a first request to begin monitoring the desktop application, monitoring the desktop application to identify the user inputs corresponding to the functions performed by the user on the desktop application, receiving a second request to terminate monitoring the desktop application, and transmitting, to the server, the user inputs.

In any of the exemplary embodiments described herein, where applicable, the method can further comprise terminating monitoring of the desktop application, and transmitting, to the server, user address information.

In any of the exemplary embodiments described herein, where applicable, the method can further comprise terminating monitoring of the desktop application, and transmitting, to the server, user identification information.

In any of the exemplary embodiments described herein, where applicable, the method can further comprise generating, based on the mobile view functions, the usage modality comprising a mobile application, receiving, from the desktop application, user identification information, and associating the user identification information with the generated mobile application.

In any of the exemplary embodiments described herein, where applicable, the first and second user inputs can be stored on the server and providing the mobile application to the mobile user device can comprise receiving from the mobile user device, a request to access the mobile application, wherein the request includes a platform to access the mobile application and providing the mobile application to the mobile user device at the requested platform.

In any of the exemplary embodiments described herein, where applicable, the first and second user inputs can be stored on the server and providing the mobile application to the mobile user device can comprise receiving from the mobile user device, a request to access the mobile application, wherein the request includes a platform to access the mobile application, identifying the mobile application based at least in part on the user identification information, and providing the mobile application to the mobile user device at the requested platform.

In any of the exemplary embodiments described herein, where applicable, generating the mobile application can be further based on the stored user inputs.

In any of the exemplary embodiments described herein, where applicable, identifying the mobile application can comprise receiving, from the mobile user device, an application name, and identifying the mobile application based on the mobile application having a title matching at least in part the application name.

In any of the exemplary embodiments described herein, where applicable, the method can further comprise capturing the first user input and the second user input, wherein the first and second functions are performed by the user on a desktop application and are related to a workflow to be mobilized, translating, based upon the capturing, the first and second functions into respective mobile view functions, and configuring, based upon the translating, the ability of the user to perform the mobilized workflow via a usage modality based on the respective mobile view functions on a mobile user device.

In any of the exemplary embodiments described herein, where applicable, the method can further comprise providing the usage modality, for download, to the mobile user device if at least one of the first and second features of the respective functions for use with the usage modality based on an amount of required workload for use with the mobile user device is less than a predetermined amount.

In any of the exemplary embodiments described herein, where applicable, capturing the first and second user inputs can comprise receiving, by a server and from the desktop application, the first and second user inputs, wherein the application workflow mobilization is a code-less mobilization, and wherein the first and second user inputs are stored on the server.

In any of the exemplary embodiments described herein, where applicable, the method can further comprise providing the usage modality, for download, to the mobile user device if at least one feature of the respective functions for use with the usage modality based on an amount of required workload for use with the mobile user device is less than a predetermined amount.

Another exemplary embodiment provides a non-transitory computer readable medium configured to capture a first user input corresponding to a first function including a first feature and a second feature, the first function performed by a user on a first computing device, and provide a usage modality, for download, to a second computing device if at least one of the first and second features of the first function for use with the usage modality based on an amount of required workload for use with the second computing device meets a threshold requirement.

Another exemplary embodiment provides a non-transitory computer readable medium configured to capture user inputs, each user input corresponding to a function including features, the functions performed by a user on a desktop application and related to a workflow to be mobilized, and provide a usage modality, for download, to a mobile user device if a required workload for the user of the mobile user device meets a threshold requirement.

Another exemplary embodiment provides a non-transitory computer readable medium configured to capture a first user input corresponding to a first function including a first feature and a second feature, and a second user input corresponding to a second function including a first feature and a second feature, the respective functions performed by a user on a first computing device, and provide a usage modality, for download, to a second computing device if at least one of the first and second features of the respective functions for use with the usage modality based on an amount of required workload for use with the second computing device is less than a predetermined amount.

Another exemplary embodiment provides a non-transitory computer readable medium configured to receive, from a desktop application, a plurality of user inputs, each user input corresponding to a respective function performed by a user on the desktop application, wherein each of the respective functions includes a plurality of features, identify the respective functions of the plurality of user inputs, translate the respective functions into respective mobile view functions, generate, based on the respective mobile view functions, a mobile application, and provide the mobile application to a mobile user device.

Another exemplary embodiment provides a non-transitory computer readable medium configured to receive a first request to begin monitoring a desktop program, monitor the desktop program to identify one or more user inputs, each user input corresponding to a respective function performed by a user on the desktop program, receive a second request to terminate monitoring the desktop program, terminate monitoring of the desktop program, and transmit, to a server, the one or more user inputs.

Another exemplary embodiment provides a non-transitory computer readable medium configured to receive, from a desktop application, a plurality of user inputs, each user input corresponding to a respective function performed by a user on the desktop application, wherein each of the respective functions includes a plurality of features, receive, from the desktop application, user identification information, identify the respective functions of the plurality of user inputs including a plurality of associated features, for each of the respective functions, determine at least one of the plurality of features for use with a mobile application based on an amount of required workload for use with a mobile user device being less than a predetermined amount, generate, based on each of the respective functions and the determined at least one of the plurality of features, the mobile application, associate the user identification information with the generated mobile application, and provide the mobile application to the mobile user device.

Another exemplary embodiment provides a non-transitory computer readable medium configured to receive, from a desktop application, a plurality of user inputs, each user input corresponding to a respective function performed by a user related to a workflow to be mobilized on the desktop application, wherein each of the respective functions includes a plurality of features, identify the respective functions of the plurality of user inputs, translate the respective functions into respective mobile view functions, configure, based on the respective mobile view functions, the ability of the user to perform the mobilized workflow via a usage modality on a mobile user device, and enable for download the usage modality to the mobile user device if at least one of the plurality of features for use with the usage modality based on an amount of required workload for use with the mobile user device is less than a predetermined amount.

Another exemplary embodiment provides a non-transitory computer readable medium configured to receive a first request to begin monitoring a program, monitor, by an application, the program to identify at least a first user input and a second user input, the first user input corresponding to a first function performed by the user on the program, the second user input corresponding to a second function performed by the user on the program, wherein the first and second functions are performed by the user on a desktop application and are related to a workflow to be mobilized, translate the first function into a first mobile view function and the second function into a second mobile view function, configure, based upon the translating, the ability of the user to perform the mobilized workflow via a usage modality based on the respective mobile view functions on a mobile user device, receive a second request to terminate monitoring the program, terminate monitoring of the program, and transmit, to a server, one or more of the user inputs.

In any of the exemplary embodiments described herein, where applicable, the non-transitory computer readable medium can be further configured to receive, from the desktop application, user address information, and provide the mobile application, for download, to the user address information.

In any of the exemplary embodiments described herein, where applicable, the non-transitory computer readable medium can be further configured to receive, from the desktop application, user identification information, and associate the user identification information with the generated mobile application.

In any of the exemplary embodiments described herein, where applicable, the non-transitory computer readable medium can be further configured to store the plurality of user inputs on the server.

In any of the exemplary embodiments described herein, where applicable, the non-transitory computer readable medium can be further configured to identify, from each of the respective functions, a plurality of features, and for each of the respective functions, determine at least one of the plurality of features for use with the mobile application based on an amount of required workload for use with the user device being less than a predetermined amount.

In any of the exemplary embodiments described herein, where applicable, the non-transitory computer readable medium can be further configured to receive, from the mobile user device, a request to access the mobile application, wherein the request includes a platform to access the mobile application, identify the mobile application based at least in part on the user identification information, and provide the mobile application to the user at the requested platform.

In any of the exemplary embodiments described herein, where applicable, the non-transitory computer readable medium can be further configured to generate the mobile application based on the stored plurality of user inputs.

In any of the exemplary embodiments described herein, where applicable, the non-transitory computer readable medium can be further configured to generate the mobile application based on the determined at least one of the plurality of features.

In any of the exemplary embodiments described herein, where applicable, the non-transitory computer readable medium can be further configured to receive an application name, and identify the mobile application based on the mobile application having a title matching at least in part the application name.

In any of the exemplary embodiments described herein, where applicable, the non-transitory computer readable medium can be further configured to transmit, to the server, user address information.

In any of the exemplary embodiments described herein, where applicable, the non-transitory computer readable medium can be further configured to store the plurality of user inputs on the server.

In any of the exemplary embodiments described herein, where applicable, the non-transitory computer readable medium can be further configured to receive a request to access the mobile application, wherein the request includes a platform to access the mobile application, identify the mobile application based at least in part on the user identification information, and provide the mobile application to the user at the requested platform.

In any of the exemplary embodiments described herein, where applicable, the non-transitory computer readable medium can be further configured to generate the mobile application based on the stored plurality of user inputs.

In any of the exemplary embodiments described herein, where applicable, the non-transitory computer readable medium can be further configured to receive an application name, and identify, the mobile application based on the mobile application having a title matching at least in part the application name.

In any of the exemplary embodiments described herein, where applicable, the non-transitory computer readable medium can further be configured to enable for generation, based on the mobile view functions, a mobile application, wherein the usage modality on the mobile user device is using the mobile application, receive, from the desktop application, user address information and user identification information, associate the user identification information with the generated mobile application, and provide the mobile application, for download, to the mobile user device using the user address information.

In any of the exemplary embodiments described herein, where applicable, program can be a desktop program, wherein receiving the first request comprises receiving, from the user and by the application, the first request to begin monitoring the desktop program, and wherein receiving the second request comprises receiving, from the user, the second request to terminate monitoring the desktop program.

In any of the exemplary embodiments described herein, where applicable, monitoring can comprise monitoring by the application, the program to identify a first user input corresponding to a first function performed by the user on the program, and a second user input corresponding to a second function performed by the user on the program, wherein transmitting comprises transmitting, to the server, the first and second user inputs, wherein first function includes a first feature and a second feature, and wherein the second function includes a first feature and a second feature.

The program can be a desktop program, wherein the first function includes a first feature and a second feature, wherein the second function includes a first feature and a second feature, and wherein the providing the usage modality, for download, to the mobile user device is if at least one of the first and second features of the respective functions for use with the usage modality based on the amount of required workload for use with the mobile user device is less than the predetermined amount.

Further, while one or more exemplary embodiments may be discussed as having certain advantageous features, one or more of such features may also be used with the various exemplary embodiments discussed herein. In similar fashion, while exemplary embodiments may be discussed below as device, system, or method exemplary embodiments, it is to be understood that such exemplary embodiments can be implemented in various devices, systems, and methods of the present disclosure.

BRIEF DESCRIPTION OF THE DRAWINGS

The following detailed description of specific exemplary embodiments of the disclosure will be better understood when read in conjunction with the appended drawings. For the purpose of illustrating the disclosure, specific exemplary embodiments are shown in the drawings. It should be understood, however, that the disclosure is not limited to the precise arrangements and instrumentalities of the exemplary embodiments shown in the drawings.

DETAILED DESCRIPTION

Although preferred exemplary embodiments of the disclosure are explained in detail, it is to be understood that other exemplary embodiments are contemplated. Accordingly, it is not intended that the disclosure is limited in its scope to the details of construction and arrangement of components set forth in the following description or illustrated in the drawings. The disclosure is capable of other exemplary embodiments and of being practiced or carried out in various ways. Also, in describing the preferred exemplary embodiments, specific terminology will be resorted to for the sake of clarity.

It must also be noted that, as used in the specification and the appended claims, the singular forms "a," "an" and "the" include plural referents unless the context clearly dictates otherwise.

Also, in describing the preferred exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges can be expressed herein as from "about" or "approximately" one particular value and/or to "about" or "approximately" another particular value. When such a range is expressed, another exemplary embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

A task can be, for example, a linear workflow or a sequence of steps on several different pages in an enterprise application wherein the user interactions may be performed on any of these pages. More narrowly, a spot task may be a simple linear workflow (e.g., function) within an enterprise application wherein the user interactions may be performed on one page of the application. However, this page can be buried deep within the complex application and the navigational effort required to reach that particular page may be high.

User interface (UI) elements (e.g., features) within an application page can be classified as: (i) READ: elements that carry content that is only consumed by the user (e.g., text content of an article); (ii) ACT: elements through which the user writes some parameters in the web application (e.g., text boxes to enter values, dropdown lists, etc.); and (iii) NAV: elements that progress the workflow to the next stage (e.g., links, submit buttons, etc.). For a spot task, each stage of the workflow, except the last stage, has only one NAV element and the final stage of the workflow can have READ/ACT/NAV elements. In other words, if the presence of READ, ACT, and NAV elements in a stage is denoted as R, A, and N, respectively, and the end of a stage is denoted as X, the spot task can be described using a regular expression as follows:

ST=[NX]*R?A?N?X

Spot tasks, for example, may include checking the revenue on an application, adding a vendor within the application, and viewing the available vacation days. Any reference to spot tasks should not be construed to limit the scope of the present invention. It should be noted that the present invention is applicable to both tasks and spot tasks. For purposes of this application, spot tasks and user interface elements may be referred to hereinafter as functions and features, respectively.

The disclosed technology may optimize the remote view for a mobile user device through application refactoring. The desktop application user interface may be dynamically transformed into an appropriate user interface for the mobile user device. Refactoring may restructure the view for the target platform without changing the underlying application behavior via two steps—(i) reducing the number of features available (defeaturization) and (ii) optimizing the application view (transformation). The benefit of this approach may stem from the fact that the features of the desktop application can be selectively chosen and transformed into highly optimized versions for usability on the smartphone.

Examples of the present disclosure may include methods and devices that enable a computer (e.g., a web server) to receive user inputs from a user of a desktop application. The user inputs are transmitted to the server from an application monitoring the desktop application. Based on the user inputs, the computer can determine functions associated with the user inputs. The computer defeaturizes the functions, i.e., reducing certain features associated with a given function. The defeaturized functions are compiled into a mobile application. Further, the server may provide the mobile application to the user via various platforms (e.g., for download, via Twitter®, Slack®, etc.).

In an example scenario, an enterprise worker, Mary, seeks to be able to perform certain functions of her job while mobile. Her company uses a desktop application called "Intuitive." "Intuitive" is available to thousands of employees and has tens of thousands of functions available to its users. Because of the high number of functions, a mobile application capable of performing all the functions is too labor intensive for a mobile device. As a result, Mary's company has a second desktop application called "Learn It." "Learn It" monitors the functions used by an employee within a specific application. Here, Mary selects a "start monitoring" feature on the "Learn It" application and then opens the "Intuitive" application. She selects certain features from the "Intuitive" application that she uses daily to perform her job. Once finished, she selects a "stop monitoring" feature from the "Learn It" application. The "Learn It" application transmits all the functions selected by Mary and sends them to a cloud computer. The cloud computer uses the functions selected by Mary to dynamically generate a mobile application tailored to Mary's needs. The cloud computer further sends Mary a download link to install the customized mobile application on her smartphone. Now, Mary is able to perform her job while mobile.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
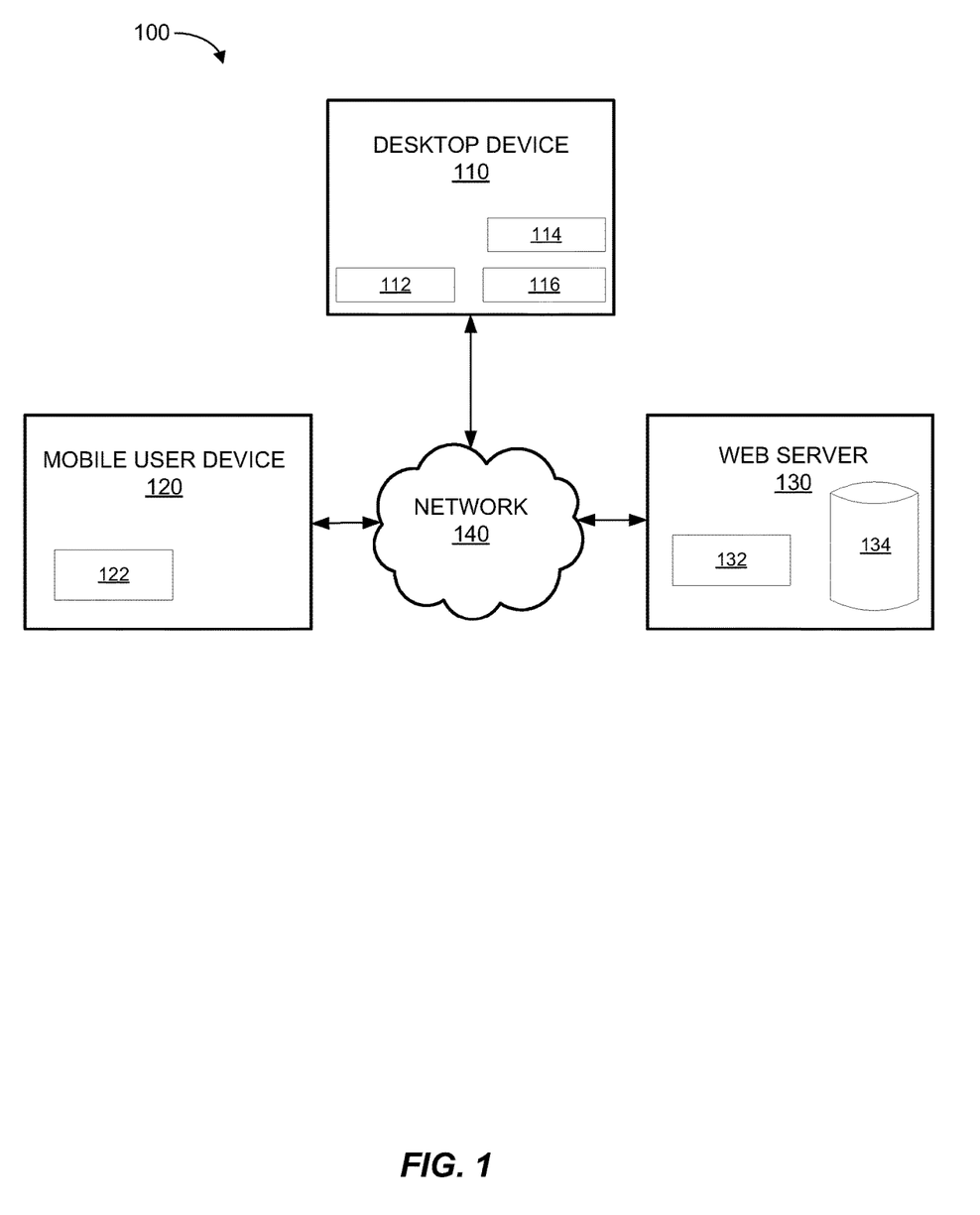
FIG. 1 is a diagram of an example system for task mobilization, in accordance with some examples of the present disclosure.

FIG. 1 shows an example environment 100 that can implement certain aspects of the present disclosure. The components and arrangements shown in FIG. 1 are not intended to limit the disclosed exemplary embodiments as the components used to implement the disclosed processes and features can vary. As shown in FIG. 1, in some implementations the environment 100 includes a desktop device 110, a mobile user device 120, a web server 130, and a network 140. The desktop device 110 may include a processor 112, a first application 114, and a second application 116. The mobile user device 120 may include a processor 122. As non-limiting examples, the mobile user device 120 may be a personal computer, a smartphone, a laptop computer, a tablet, or another personal computing device. The desktop device 110 may include any personal computing device including a laptop, desktop computer, mainframe, and/or the like. The network 140 can include a network of interconnected computing devices such as, for example, an intranet, a cellular network, or the Internet. And, while shown as a single device in FIG. 1, the web server 130 can include one or more physical or logical devices (e.g., servers), cloud servers, remote servers, etc. The web server 130 may include a processor 132 and a database 134. An example computer architecture that may be used to implement the desktop device 110, the mobile user device 120, the web server 130, and the network 140 is described below with reference to FIG. 5.

In certain implementations according to the present disclosure, the desktop device 110 may monitor a desktop program. More specifically, the first application 114 may be monitored by the second application 116. In some exemplary embodiments, the second application 116 may run on a central processing unit (CPU) of a remote device. The second application 116 may receive a first request from a user to begin monitoring the first application 114. The first request may also include an identifier used to determine the first application 114 is the application to monitor. The second application 116 may also receive a second request from a user to terminate monitoring the first application 114. The second application 116 may identify one or more user inputs. Each user input may correspond to a respective function performed by the user on the desktop program (e.g., first application 114). The second application 116 may also retrieve user address information from the desktop device 110. The user address information may be stored on the desktop device 110 and/or inputted by the user. The second application 116 may transmit the user address information, via the processor 112, to the web server 130. The second application 116 may also receive user identification information from the user and/or may retrieve the user identification information from the desktop device 110. The second application 116 may transmit, via the processor 112, the user identification information to the web server 130.

Turning to the web server 130, the web server 130 may receive a plurality of user inputs from the desktop device 110. The web server 130 may store the plurality of user inputs within the database 134. Each user input may correspond to a respective function performed by the user on the first application 114. Further, each of the respective functions may include a plurality of features. As an example, a function may be "Approve Requisitions" and features included with the function may allow the user to approve all requisitions by a certain date, approve based on position, etc. The web server 130 may also receive user identification information, user address information, and/or an application name from the desktop device 110. The web server 130 may identify the respective functions of the plurality of user inputs including the plurality of associated features. The web server 130 may translate the respective functions into respective mobile view functions. In some exemplary embodiments, for each of the respective functions, the web server 130 may determine at least one of the plurality of features for use with a mobile application based on an amount of required workload for use with the mobile user device 120 being less than a predetermined amount. Workload may include the amount of data associated with a feature and/or the number of characters associated with a feature to ensure user interface elements will fit within one tweet, SMS message, and/or a single span of the screen. Accordingly, the determined features may be incorporated into the generated mobile application.

The web server 130 may generate, based on each of the respective functions and the determined at least one of the plurality of features, the mobile application. In some exemplary embodiments, the web server 130 may further generate the mobile application based on the stored plurality of user inputs. Therefore, the mobile application may be generated based on an aggregate of the plurality of user inputs which may be received from multiple uses of the first application 114. The web server 130 may also associate the user identification information with the generated mobile application. The web server 130 may provide the mobile application to the mobile user device 120.

By associating the user identification information with the mobile application, the web server 130 may more easily identify the mobile application to be provided to the mobile user device 120. Similarly, the received application name may more easily allow the web server 130 to identify the mobile application by matching at least in part a title of the mobile application with the application name. In some exemplary embodiments, the web server 130 may provide the mobile application in response a request from the mobile user device 120 to access the mobile application. Further, the request may include a platform to access the mobile application. Accordingly, the web server 130 provides the mobile application to the mobile user device 120 at the requested platform. The platform may include a social media platform (e.g., Twitter®, Slack®), a workplace collaboration platform, email, and/or SMS. Additionally, the web server 130 may provide, to the mobile user device 120, the mobile application for download. In some exemplary embodiments, the web server 130 may transmit a download link to the user at the user address information. For example, the user may receive a download link at her email address.

Figure 2:
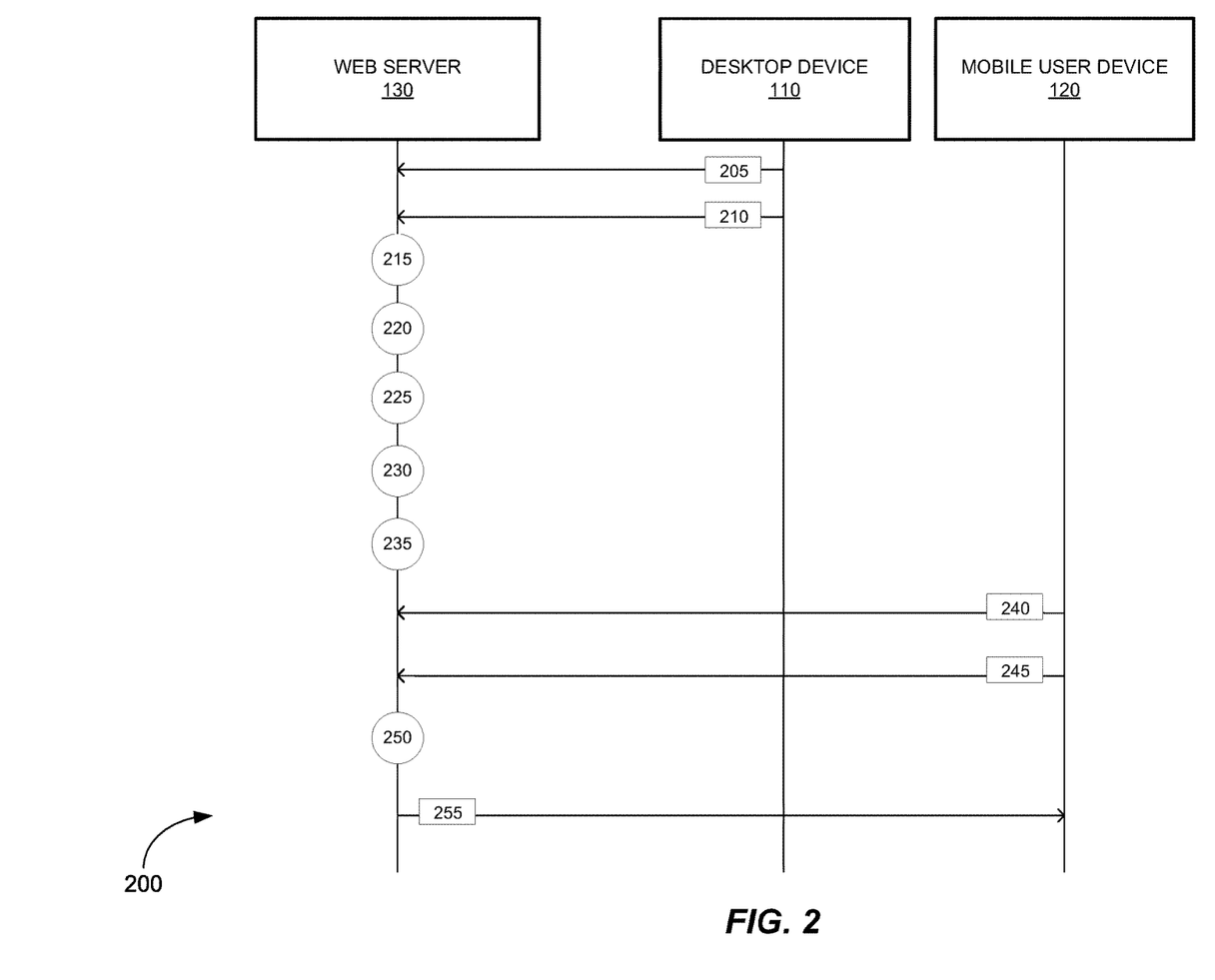
FIG. 2 is an example timing diagram for task mobilization, in accordance with some examples of the present disclosure.

FIG. 2 illustrates an example timing diagram for task mobilization. The diagram illustrates the web server 130 receiving user inputs associated with a desktop application from the desktop device 110, generating a mobile application, i.e., a mobile version of the desktop application, based on the user inputs, and providing the mobile application to the mobile user device 120.

At 205, the desktop device 110 may transmit a plurality of user inputs to the web server 130. Each user input may correspond to a respective function performed by the user on the desktop application (e.g., first application 114). In some exemplary embodiments, the second application 116 monitors the first application 114, and transmits, via the processor 112, the plurality of user inputs to the desktop device 110. At 210, the desktop device 110 may transmit the user identification information to the web server 130. At 215, the web server 130 may identify the respective functions of the plurality of user inputs include the plurality of associated features. At 220, the web server 130 may determine, for each of the respective functions, at least one of the plurality of features for use with a mobile application based on an amount of required workload for use with the mobile user device 120 being less than a predetermined amount. For example, because of limited processing speed and storage on the mobile user device 120, the mobile application is best suited for the mobile user device 120 when the size of the executable file is relatively small and not heavily burdensome on the processor 122.

At 225, the web server 130 may generate the mobile application based on each of the respective functions and the determined at least of one the plurality of features. The web server 130 may associate a title with the generated mobile application. At 230, the web server 130 may associate the user identification information with the generated mobile application. Because the web server 130 may generate several mobile applications, associating the mobile application with the user identification information makes identifying the appropriate mobile application for the appropriate user easier. At 235, the web server 130 may store the plurality of user inputs within database 134. The stored plurality of user inputs may allow the web server to generate the mobile application for the user based on multiple sessions with the desktop program (e.g., first application 114).

At 240, the web server 130 receives a request to access the mobile application from the mobile user device 120. The request may include the platform (e.g., a social media platform, a workplace collaboration platform, email, SMS) to access the mobile application. At 245, the web server 130 may receive an application name from the mobile user device 120. At 250, the web server 130 may identify the mobile application based on the title of the mobile application matching at least in part the application name. At 255, the web server 130 may provide the mobile application to the mobile user device 120. The web server 130 may provide the mobile application for download via a link sent to the user address information. In some exemplary embodiments, the mobile application may be provided to the mobile user device 120 via the requested platform. Once received, the user of the mobile device 120 may be able to perform similar functions to those originally performed on the desktop device 110.

Figure 3:
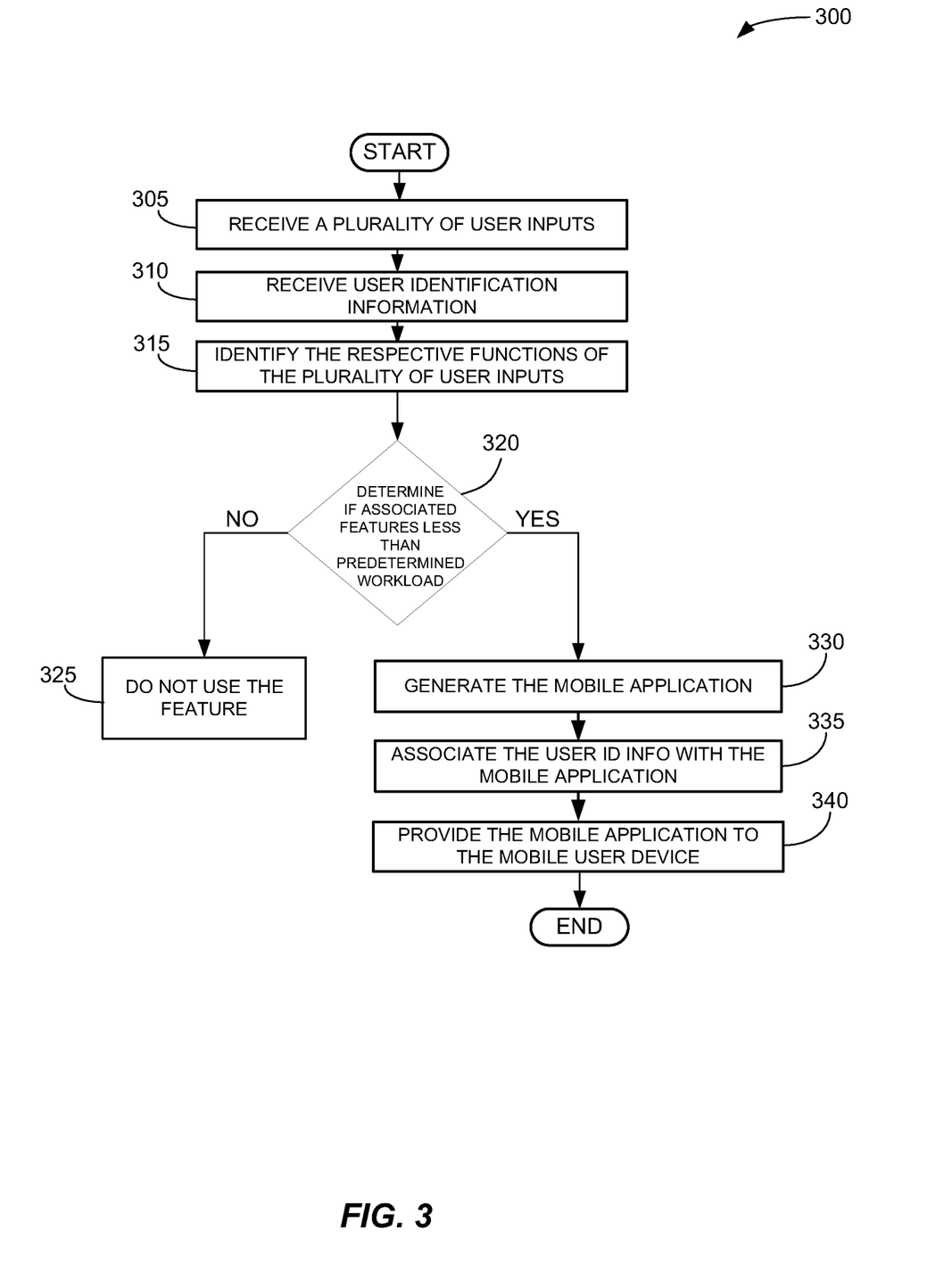
FIG. 3 is an example flow chart of a method for task mobilization from a server perspective, in accordance with some examples of the present disclosure.

FIG. 3 illustrates an example flow chart of a method for task mobilization from a server perspective. Similar to FIG. 2, the flow chart illustrates the web server 130 receiving user inputs associated with a desktop application from the desktop device 110, generating a mobile application, i.e., a mobile version of the desktop application, based on the user inputs, and providing the mobile application to the mobile user device 120.

At 305, the web server 130 may receive a plurality of user inputs from the desktop device 110. At 310, the web server 130 may receive user identification information from the desktop device 110. The user identification information may include a username/password, biometric data including fingerprints, optical data, and voice data, a personal identification number, and/or the like. At 315, the web server 130 may identify the respective function of the plurality of user inputs. For example, the first application 114 may include a dashboard with several functions (e.g., "generate a report," "compress data," "translate"). If a user selects, i.e., the user input, the option to "generate a report," the desktop device 110 transmits the user input to the web server 130.

At 320, the web server 130 determines whether the features associated with the respective functions are less than a predetermined workload. A feature may be a component used to perform the function. For example, several features may be available in the "generate a report" function. In this example, a feature may include allowing the user to select the database from a dropdown box rather than the user inputting the database name. Or, the feature may include the ability to view charts in a color-coded manner. The predetermined amount may ensure that when all of the features and respective functions are translated into the mobile view, the size of mobile application is suitable for the mobile user device 120.

At 325, after the web server 130 determines that certain features are equal to or above the predetermined workload, at 320, discards the features. Therefore, those features will not be used in generating the mobile device application. At 330, based on each of the respective functions and the determined plurality of features being less than the predetermined amount, the web server 130 may generate the mobile application. At 335, the web server 130 may associate the user identification information with the generated mobile application. At 340, the web server 130 may provide the mobile application to the mobile user device 120.

Figure 4:
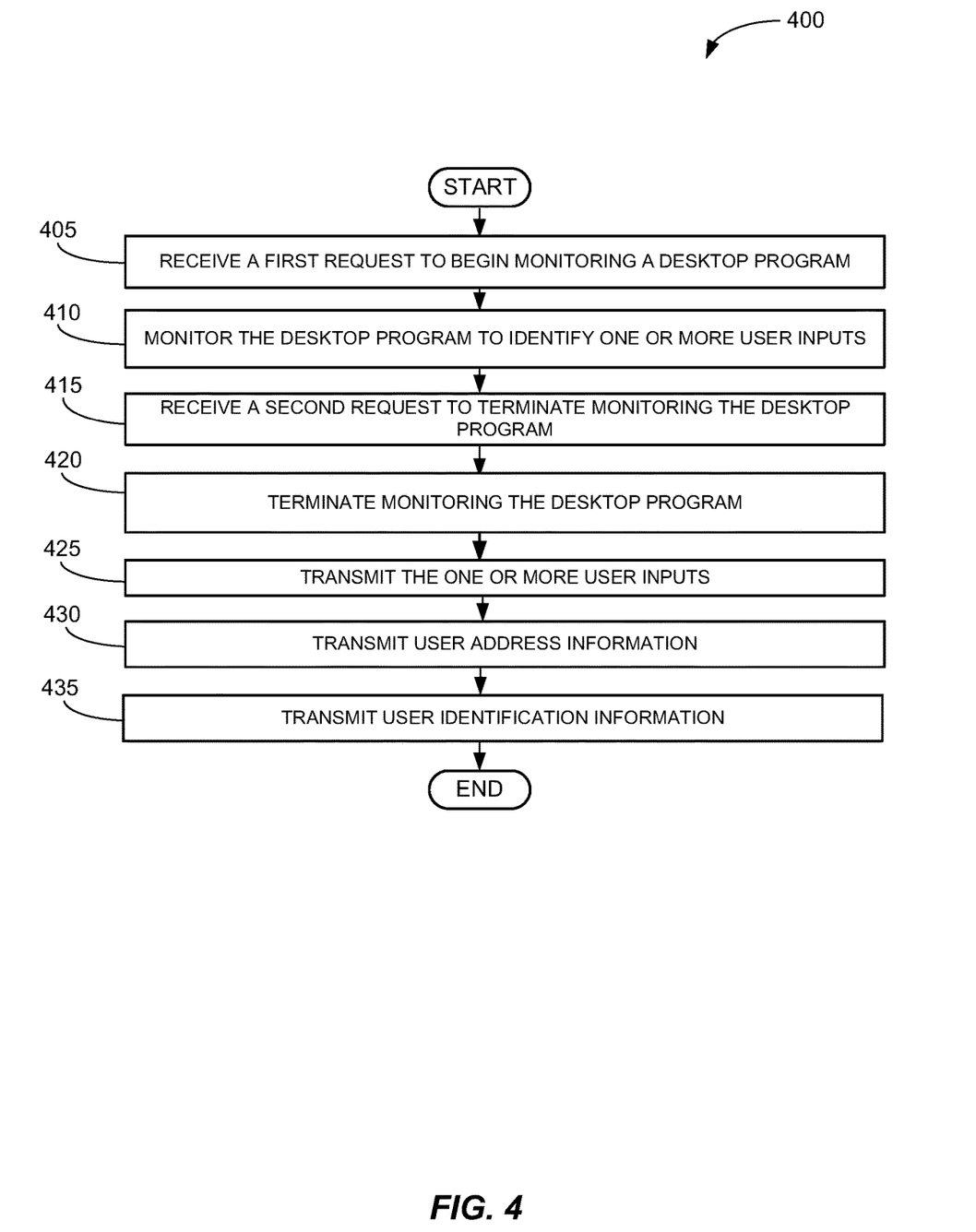
FIG. 4 is another example flow chart of a method for task mobilization from a desktop device perspective, in accordance with some examples of the present disclosure.

FIG. 4 illustrates another example flow chart of a method for task mobilization from a desktop device perspective. The flow chart shows the steps involved in the second application 116 monitoring the first application 114. The second application provides information received from monitoring the first application 114 to the processor 112. The processor 112 transmits the information to the web server 130.

At 405, the second application 116 may receive the first request to begin monitoring the desktop program (e.g., first application 114). At 410, the second application 116 may begin monitoring the first application 114. Monitoring the first application 114 may include determining the one or more user inputs received by the first application 114. Each of the user inputs may correspond to a respective function performed by the user on the first application 114. At 415, the second application 116 may receive the second request to terminate monitoring the first application 114. At 420, in response to the second request, the second application 116 may terminate monitoring the first application 114.

The second application 116 may provide the one or more user inputs to the processor 112. At 425, the processor 112 may transmit the one or more user inputs to the web server 130. The second application 116 may retrieve user address information from the desktop device 110. The user address information may be stored on the desktop device 110 and/or inputted by the user. Further, the second application 116 may provide the user address information to the processor 112. At 430, the processor 112 may also transmit user address information to the web server 130. The second application 116 may receive user identification information from the user and/or may retrieve the user identification information from the desktop device 110. Also, the second application 116 may provide the user identification information to the processor 112. At 435, the processor 112 may transmit user identification information to the web server 130.

Figure 5:
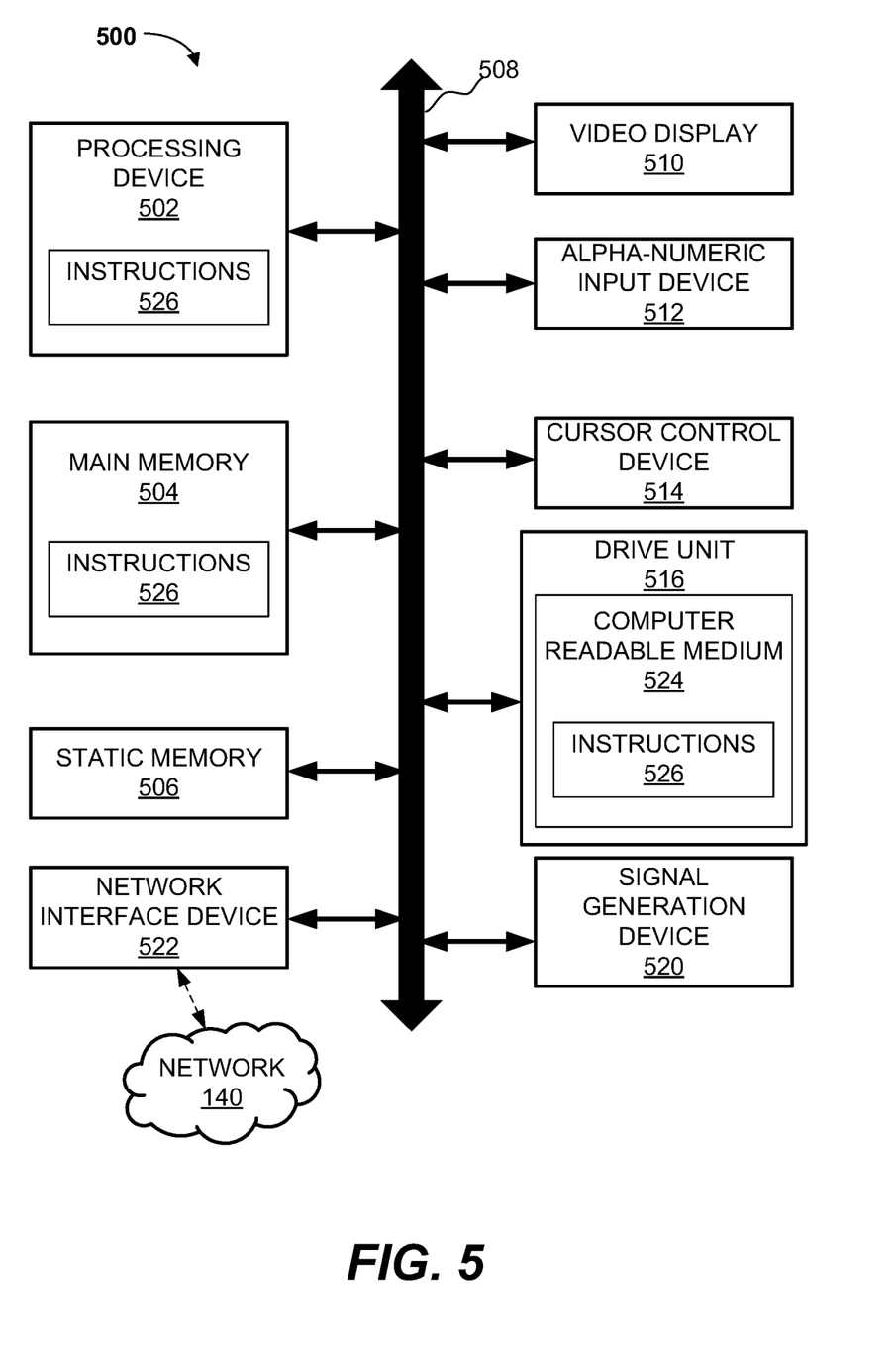
FIG. 5 is a block diagram of an example computer system that implement certain aspects of the present disclosure.

FIG. 5 is a block diagram of an example computer system 500 that can implement certain aspects of the present disclosure. For example, the computer system 500 can be representative of the desktop device 110, the mobile user device 120, and/or the web server 130. The computer system 500 can include a set of instructions 526 for controlling operation of the computer system 500. In some implementations, the computer system 500 can be connected (e.g., networked) to other machines in a Local Area Network (LAN), an intranet, an extranet, a satellite communications system, or the Internet. The computer system 500 can operate in the capacity of a server or a client machine in a client-server network environment, or as a peer machine in a peer-to-peer (or distributed) network environment. As non-limiting examples, the computer system 500 can be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single computer system 500 is illustrated, the term "machine" shall also be taken to include any collection of machines (e.g., computers) that individually or jointly execute a set (or multiple sets) of instructions to perform any one or more of the methodologies discussed herein.

The computer system 500 includes a processing device 502, a main memory 504 (e.g., read-only memory (ROM), flash memory, dynamic random-access memory (DRAM) such as synchronous DRAM (SDRAM), etc.), a static memory 506 (e.g., flash memory, static random-access memory (SRAM), etc.), and a secondary memory 516 (e.g., a data storage device), which communicate with each other via a bus 508.

The processing device 502 represents one or more general-purpose processing devices such as a microprocessor, a microcontroller, a central processing unit, or the like. As non-limiting examples, the processing device 502 can be a reduced instruction set computing (RISC) microcontroller, a complex instruction set computing (CISC) microprocessor, a RISC microprocessor, very long instruction word (VLIW) microprocessor, a processor implementing other instruction sets, or one or more processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute the operations for electronically creating and trading derivative products based on one or more indices relating to volatility.

The computer system 500 can further include a network interface device 522, which is connectable to a network 140. The computer system 500 also can include a video display unit 510, i.e., a display (e.g., a liquid crystal display (LCD), a touch screen, or a cathode ray tube (CRT)), an alphanumeric input device 512 (e.g., a keyboard), a cursor control device 514 (e.g., a mouse), and a signal generation device 520 (e.g., a speaker).

The secondary memory 516 can include a non-transitory storage medium 524 on which is stored one or more sets of instructions 526 for the computer system 500 representing any one or more of the methodologies or functions described herein. For example, the instructions 526 can include instructions for implementing an asset tracking device including a power source and power management system or subsystem for a container or a trailer. The instructions 526 for the computer system 500 can also reside, completely or at least partially, within the main memory 504 and/or within the processing device 502 during execution thereof by the computer system 500, the main memory 504 and the processing device 502 also constituting computer-readable storage media.

While the storage medium 524 is shown in an example to be a single medium, the term "storage medium" should be taken to include a single medium or multiple media that store the one or more sets of instructions for a processing device. The term "storage medium" shall also be taken to include any medium that is capable of storing or encoding a set of instructions for execution by the machine that cause the machine to perform any one or more of the methodologies of the disclosure. The term "storage medium" shall accordingly be taken to include, but not be limited to, solid-state memories, and optical and magnetic media.

In this description, numerous specific details have been set forth. It is to be understood, however, that implementations of the disclosed technology can be practiced without these specific details. In other instances, well-known methods, structures and techniques have not been shown in detail in order not to obscure an understanding of this description. References to "one embodiment," "an embodiment," "some exemplary embodiments," "example embodiment," "various exemplary embodiments," "one implementation," "an implementation," "example implementation," "various implementations," "some implementations," etc., indicate that the implementation(s) of the disclosed technology so described can include a particular feature, structure, or characteristic, but not every implementation necessarily includes the particular feature, structure, or characteristic. Further, repeated use of the phrase "in one implementation" does not necessarily refer to the same implementation, although it can.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
    capturing a first user input corresponding to a first function including a first feature and a second feature, the first function performed by a user on a first computing device;
    capturing a second user input corresponding to a second function including a first feature and a second feature, the second function performed by the user on the first computing device; and
    providing a usage modality, for download, to a second computing device if at least one of the first and second features of the respective functions for use with the usage modality based on an amount of required workload for use with the second computing device meets a threshold requirement being less than a predetermined amount.

2. The method of claim 1, wherein the first computing device is a desktop; and
    wherein the first function is performed by the user on an application on the first computing device.

3. The method of claim 1, wherein the first function is related to a workflow to be mobilized;
    wherein the second computing device is a mobile user device; and
    wherein providing the usage modality for download to the mobile device is based upon whether the required workload for the user of the mobile device meets the threshold requirement.

4. The method of claim 3, wherein the method is a code-less method of application workflow mobilization.

5. The method of claim 3 further comprising translating, based upon the capturing, respective functions into respective mobile view functions.

6. The method of claim 5 further comprising configuring, based upon the translating, the ability of the user to perform the mobilized workflow via the usage modality based on the respective mobile view functions on the mobile user device.

7. A method of application workflow mobilization comprising:
    capturing user inputs, each user input corresponding to a function including features, the functions performed by a user on a desktop application and related to a workflow to be mobilized; and
    providing a usage modality, for download, to a mobile user device if at least one of the features of the respective functions for use with the usage modality based on an amount of a required workload for the user of the mobile user device meets a threshold requirement being less than a predetermined amount.

8. The method of claim 7 further comprising:
    translating, based upon the capturing, respective functions into respective mobile view functions; and
    configuring, based upon the translating, the ability of the user to perform the mobilized workflow via the usage modality based on the respective mobile view functions on the mobile user device.

9. The method of claim 8 further comprising:
    identifying the functions of the inputs;
    generating the usage modality comprising a mobile application;
    receiving, from the desktop application, user identification information; and
    associating the user identification information with the generated mobile application.
    wherein capturing the user inputs comprises receiving, by a server and from the desktop application, the user inputs;
    wherein the application workflow mobilization is a code-less mobilization; and
    wherein the user inputs are stored on the server.

10. A non-transitory computer readable medium configured to:

capture a first user input corresponding to a first function including a first feature and a second feature, the first function performed by a user on a first computing device;

capture a second user input corresponding to a second function including a first feature and a second feature, the second function performed by the user on the first computing device; and provide a usage modality, for download, to a second computing device if at least one of the first and second features of the respective functions for use with the usage modality based on an amount of required workload for use with the second computing device meets a threshold requirement being less than a predetermined amount.

11. The non-transitory computer readable medium of claim 10, being further configured to:

monitor, by an application, the first computing device to identify the first user input;

terminate monitoring of the first computing device; and transmit, to a server, the first user input.

12. The non-transitory computer readable medium of claim 10, being further configured to:

receive a first request to begin monitoring the first computing device; and receive a second request to terminate monitoring the first computing device.

13. The non-transitory computer readable medium of claim 12, being further configured to:

translate the first function into a mobile view function; and generate, based on the mobile view function, a mobile application for download on the second computing device.

14. The non-transitory computer readable medium of claim 13, being further configured to:

identify the first function of the first user input;

receive, from the first computing device, user address information; and provide the mobile application, for download, to the second computing device based upon user address information.

15. The non-transitory computer readable medium of claim 13, being further configured to:

identify the first function of the first user input;

provide the mobile application to the second computing device comprising a mobile user device;

receive, from the first computing device comprising a desktop application, user identification information; and associate the user identification information with the generated mobile application.

16. The non-transitory computer readable medium of claim 10, being further configured to:

translate, based upon the capturing, the first and second functions into respective mobile view functions; and configure, based upon the translating, the ability of the user to perform a mobilized workflow via the usage modality based on the respective mobile view functions on the second computing device comprising a mobile user device;

wherein the first computing device comprises a desktop application; and wherein the first and second functions are related to the workflow to be mobilized.

17. The non-transitory computer readable medium of claim 16, wherein capturing the first and second user inputs comprises receiving, by a server and from the desktop application, the first and second user inputs;

wherein the application workflow mobilization is a codeless mobilization; and wherein the first and second user inputs are stored on the server.

18. The non-transitory computer readable medium of claim 16, being further configured to:

receive a first request to begin monitoring a program running on the first computing device;

monitor, by an application, the program to identify the respective user inputs, wherein the respective user inputs are related to a workflow to be mobilized;

translate the first function into a first mobile view function and the second function into a second mobile view function;

configure, based upon the translating, the ability of the user to perform the mobilized workflow via the usage modality based on the respective mobile view functions on the second computing device comprising a mobile user device;

receive a second request to terminate monitoring the program;

terminate monitoring of the program; and transmit, to a server, one or more of the user inputs.

* * * * *